United States Patent [19]

Sachs

[11] Patent Number: 4,981,518

[45] Date of Patent: Jan. 1, 1991

[54] BONDED COMPOSITE STRUCTURE AND METHOD OF MAKING

[76] Inventor: Melvin H. Sachs, 5415 Fairway La., West Bloomfield, Mich. 48033

[21] Appl. No.: 110,615

[22] Filed: Oct. 19, 1987

Related U.S. Application Data

[63] Continuation of Ser. No. 832,323, Feb. 24, 1986, abandoned.

[51] Int. Cl.$^5$ ................................................ C04B 9/04
[52] U.S. Cl. ...................................... 106/691; 106/690; 264/112; 264/122; 264/333; 427/403; 427/427
[58] Field of Search ............... 264/122, 112, 125, 333; 106/85, 121, 691, 690; 501/111, 118, 119, 109, 121, 94, 95; 427/403, 427

[56] References Cited

U.S. PATENT DOCUMENTS

| | | | |
|---|---|---|---|
| 2,859,484 | 11/1958 | French et al. | 264/122 |
| 3,271,492 | 9/1966 | Elmendorf | 264/122 |
| 4,262,055 | 4/1981 | Russell et al. | 428/341 |
| 4,339,405 | 7/1982 | Paszner | 264/108 |
| 4,419,133 | 12/1983 | Shubow et al. | 106/85 |
| 4,487,632 | 12/1984 | Sherif et al. | 106/85 |
| 4,503,109 | 3/1985 | Shubow et al. | 428/161 |
| 4,505,752 | 3/1985 | Sherif et al. | 106/85 |
| 4,547,403 | 10/1985 | Smith | 427/196 |

*Primary Examiner*—Mary Lynn Fertig Theisen
*Attorney, Agent, or Firm*—Reising, Ethington, Barnard, Perry & Milton

[57] ABSTRACT

A fire resistive and insulating bonded composite structure includes a binder made from a mixture of a weak acid and a powdered base metal oxide wherein the acid and metal fuse as a mixture under an exothermic reaction into the binder. A fibrous cellulose material is encapsulated within the binder and rendered non-flammable thereby. The subject invention further provides a method of making the bonded composite structure including the steps of mixing the weak acid and powdered base metal oxide, encapsulating the fibrous cellulose material within the binder and rendering the fibrous cellulose material non-flammable thereby, forming the slurry mixture into a predetermined form, and setting the formed mixture into a solid.

18 Claims, No Drawings

BONDED COMPOSITE STRUCTURE AND METHOD OF MAKING

This is a continuation of Ser. No. 832,323, filed Feb. 24, 1986, now abandoned.

TECHNICAL FIELD

This invention relates generally to bonded composite structures and methods for making the same. More particularly, this invention relates to bonded composite structures for forming fire resistive and insulating building materials and/or components such as panel structures, pipe insulation, and sprays for forming fire protective and insulating type coatings on pre-existing structures.

BACKGROUND ART

In the past, various materials have been used to form building materials such as molded panels. Initially, polyurethane and isocyanurate foamed plastics, both petroleum derivatives, were used to manufacture molded panels. Such panels were light weight, low cost, and thermally efficient. The components were readily available and could be easily transported. When the basic ingredients were combined, they expanded to approximately twenty times their original volume encapsulating myriads of minute gas bubbles. Initially, such panels were susceptible to slight shrinkage during set and cure stages. Such problems were later overcome. However, a controversy arose within the construction industry concerning the use of foam plastics in buildings. It was discovered that under certain conditions of heat and/or fire, the materials burned. The gases emitted were toxic. Under high heat with a spark, those gases could flash or explode. Additionally, since 1973, the subsequent ever upward spiraling cost of petroleum products further decreased the desirability of these foamed plastics as building components.

After a two year indepth analysis, it was determined by consent agreement between the Federal Trade Commission and the Society of Plastics Industry that foamed plastics could be used in buildings if they were totally encapsulated within fire resistive, nontoxic materials. Such materials were formed by encapsulating the foamed plastics in a variety of inorganic products such as a rigid homogenous foamed glass product manufactured by Pittsburgh Corning Corporation and marketed under the trademark "FOAMGLAS".

The U.S. Pat. No. 4,419,133 to Shubow et al, issued Dec. 6, 1983, discloses a bonded aggregate structure for making moldable rigid insulation. The Shubow et al patent discloses a bonded aggregate structure made from a mixture of magnesium oxide, aluminum oxide, aggregate, and mono aluminum phosphate acidic solution. The aggregates disclosed are cellular, low density aggregates selected from the group including inorganic materials such as glass beads, perlite, vermiculite, and stone or other refractory aggregates.

Further development has proceeded in search of methods of producing bonded composite structures at lower costs. Such structures must be of low cost but must also withstand high temperatures. The instant invention provides a low cost bonded composite structure wherein the binders are blended or mixed with a fibrous cellulose filler which is essentially a waste product that produces results similar to those achieved with the use of inorganic, insulating-type aggregates but at a much lower cost. Such organic materials would normally be highly flammable. Unexpectedly, however, pursuant to the subject invention, such cellulose filler materials do not burn and form rigid bonded structures able to withstand temperatures in excess of 3000° F.

STATEMENT OF THE INVENTION

The subject invention provides a bonded composite structure essentially consisting of a binder made from a mixture of a weak acid and a powdered base metal oxide, the acid and metal fusing as a mixture under an exothermic reaction into the binder. The invention is characterized by including a cellulose filler material encapsulated within the binder and rendered non-flammable thereby.

The subject invention further provides a method of making a bonded composite structure including the steps of mixing a weak acid and a powdered base metal oxide which fuse as a mixture under an exothermic reaction into a binder. A cellulose filler material is encapsulated within the binder and the cellulose filler material is rendered non-flammable thereby. The mixture is formed into a predetermined form and the formed mixture is set and cures to a solid structure.

DETAILED DESCRIPTION OF THE INVENTION

The invention is a bonded composite structure consisting essentially of a binder material made from a mixture of a weak acid and a powdered base metal oxide and a cellulose filler material.

The reaction of the acid and base metal oxide form the binder which acts as a glue for encapsulating the cellulose filler material and for adhering the bonded composite structure to whatever surface the bonded composite structure is applied. In other words, the bonded composite structure is made by combining three or more ingredients in varying proportions depending upon the end product and time of set desired. The basic ingredients include a liquid not unlike the consistency of water, a powder not unlike the consistency of Portland cement, and a cellulose filler material.

The cellulose filler material can be selected from the group of cellulose waste materials including, but not limited to, saw dust, wood chips, shredded newspaper, straw, and bagasse. Other cellulose containing waste materials commonly discarded by the public may be utilized in the invention. The cost efficiency of these materials as compared to previously used inorganic aggregates is significant and thereby provides a distinct advantage to the subject invention. Such cellulose waste products are normally easily ignitable under normal conditions. Pursuant to the subject invention, however, the cellulose filler materials are encapsulated within the binder and rendered non-flammable thereby. While foamed plastic insulations (polystyrene, polyurenthane, isocyanrate and the like) can be fabricated into similar type products, they can melt at relatively low temperatures, they can burn, they can degrade under ultraviolet light, they can give off profuse amounts of smoke and toxic gases when ignited or, in some cases, only heated and, when utilized in habitable spaces, they must be enclosed or encapsulated within fire resistive materials. On the other hand, the subject invention will not begin to melt until temperatures in excess of 3000° F. have been reached. The subject invention will not burn. It will not degrade under ultraviolet light. It will not give off toxic gases, and it does not require a separate fire barrier. The subject invention is a fire barrier by itself. Moreover, while the foam plastic products are derivatives of petroleum and totally dependent upon the availability and price deviations of petroleum products, the subject invention is completely independent of the oil industry.

Preferably, the cellulose filler materials have a low density in the range from 3 to 15 pounds per cubic foot. Such low density materials are preferred in applications where high mass is a problem and low weight is desired.

The weak acid is selected from the group including mono aluminum phosphate. Other weak acids may be used which in combination with the powdered base metal oxide, such as magnesium oxide, form a magnesium phosphate solid. Such a magnesium phosphate solid will normally be formed relative quickly and stick to almost anything and binds together whatever materials might also happen to be in contact with the mixture. The weak acid and base metal oxide may be combined in a range of ratios from "3 to 1" to "1 to 3", respectively by weight. The cellulose filler materials are combined with the weak acid in a "1 to 1" to "1 to 6" ratio by weight.

The binder has a predetermined setting time. The binder can include water and/or other ingredient similar to those disclosed in the Shubow patent for delaying the setting time, the amount of water by part being directly related to the setting time. The set is chemical as when concrete or plaster mixes set. This is not a cure in the technical sense. Increasing the water content of the mixture can increase the setting time from an instantaneous to a 10 minute set.

Aluminum oxide can also be added to the mixture to increase the setting time. Increasing the relative proportion of aluminum oxide increases the setting time. The weight ratio of aluminum oxide to acidic solution is from about 1:1 to about 1:3 and the weight ratio of magnesium oxide to aluminum oxide is from about 1:1 to about 1:6.

Plasticizers can be used to adjust the plasticity of the final product without the further addition of water. Alternatively, plasticity can be kept constant by decreasing the amount of water in the mixture and adding a plasticizer. An example of a plasticizer is polypyrogenic silica having a particle size of 0.01 to 0.02 microns or the equivalent sold as X-59 TM manufactured by Cabot Corporation, Boston, Mass.

The base metal can be magnesium oxide purchased from Martin Marietta Chemicals under the trade name MegChem. The base metal may include powder particles of a predetermined extent of being finally divided, the extent of being finally divided of the powder particles is directly related to the setting time. For example, the magnesium oxide may be purchased from Martin Marietta Chemicals as MagChem 40 or MagChem 30. MagChem 40 typically includes 98% magnesium oxide, has a particle size of 5 microns, and a surface area of 45 gm$^2$. MagChem 30 is typically 98% magnesium oxide, has a particle size of 5 microns and a surface area of 20 gm$^2$. The setting time for MagChem 30 is slower than the setting time for MagChem 40. This is attributed to MagChem 40 having more surface area.

The ammonium phosphate or aluminum phosphate may be purchased as ammonium phosphate or aluminum phosphate solution from Stauffer Chemical Company. Aluminum phosphate solution may also be referred to as aluminum phosphate or an acidic solution of mono aluminum phosphate. The ammonium phosphate or aluminum phosphate are a clear water white acidic aqueous solutions and are generally purchased as a 50% aqueous solutions.

The subject invention further provides a method of making the bonded composite structure. Generally, the method includes the steps of mixing the acid and the powdered base metal oxide which fuse as a mixture under an exothermic reaction into a binder. The fibrous cellulose material is encapsulated within the binder and is rendered non-flammable thereby. The mixture is formed into a predetermined form and the predetermined form is set during a predetermined period of time. The time for setting may be instantaneous or range up to or greater than 10 minutes. The setting time may be controlled by various factors set forth below. The setting time is chosen based on the desired end use of the encapsulated composite material.

For example, the mixture may be formed by extruding the mixture to form pipe insulation. In such an end use, water may be added to the mixture to delay the setting step for 30 second to 1 minute. Such alternation of the mixture provides what would be considered an intermediate setting time in comparison to the normally instantaneous setting time of the mixture. Alternatively, a less finally divided powdered metal oxide can be used to delay the setting step for 30 second to 1 minute.

The forming step may alternatively take the form of spraying the mixture onto a previously existing structure to form a fire protective and/or insulation layer on the structure. It is preferable in a spraying step to have material which almost instantaneously sets in 1 to 2 seconds. A blending approach, wherein the three ingredients are mixed together provides an almost immediate set. For example, the three ingredients may be added separately into a blending assembly and mixed just ahead of a spray nozzle. The mixture is the immediately impelled as a homogeneous slurry into a mold or a target. As temperature inversely affects the setting time of the mixture, the temperature of the mixture may be raised to further decrease the setting time (increase the speed of the reaction) or lowered to increase the setting time significantly (slow down the reaction).

A third example of forming the mixture is forming the mixture over an endless belt to form various board and/or panel stocks. In this manner, premanufactured insulation boards may be generated whereby a single board provides physical structure and, in addition, provides protection from heat and/or fire. For example, wood chips can be added to the binder to manufacture fire retardant plywood or chipboard type boards. By incorporating the cellulose waste materials, the cost of manufacturing and supplying such materials is significantly reduced.

The subject method provides a family of nontoxic, fire resistive lightweight, low-cost, moldable, rigid insulations which satisfy the need the high speed, cost effective, energy efficient building construction technologies. The subject invention can be manufactured in a variety of ways, such as by continuous extrusion and endless belt production, as well as being sprayed from a blending device. Such methods of production depend on the ultimate shape and/or use of the product. The product has been tested in test buildings and has been found to be insulative at least up to 3000° F. Thus, the instant invention provides an effective fire protective and insulative barrier which further provides structural rigidity at a significantly decreased cost from prior art products and methods.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that with the scope of the appended claims the invention may be practiced otherwise than as specifically described.

TABLE 1

| Brick No. | Sawdust | Water | MgO | AlPO$_4$ | Plasticizer |
|---|---|---|---|---|---|
| 1 | 1 | 0.3 | 2 | 3 | |
| 2 | 1 | 1 | 2 | 2.5 | |
| 3 | 1 | 1 | 2 | 2 | |
| 4 | 1 | 1.5 | 2.25 | 2.25 | 0.35 |

EXAMPLE 1

Bricks were made by varying the ratios of ingredients as parts by weight as detailed in Table 1. The brinks had excellent heat resistant characteristics and were subjected to flames exceeding 3000° F.

TABLE 2

| Brick No. | H$_2$O | Acid | Setting Time (seconds) |
|---|---|---|---|
| 1 | 20 | 80 | 20 |
| 2 | 30 | 70 | 25 |
| 3 | 50 | 50 | 25 |

EXAMPLE 2

Bricks were made by varying the ratio of water to acid AlPO$_4$ as parts by weight as detailed in Table 2. An increase in percent water by parts increased the setting time.

TABLE 3

| Brick No. | Acid | Water | MgO | Setting Time (seconds) |
|---|---|---|---|---|
| 1 | 50 | 50 | 100 | 65 |
| 2 | 50 | 40 | 100 | 55 |
| 3 | 50 | 50 | 120 | 50 |
| 4 | 40 | 60 | 100 | 60 |

EXAMPLE 3

Bricks were made varying the ratios of acid (AlPO$_4$), water and MgO as parts by weight and setting times were determined as detailed in Table 3. A decrease in water, keeping the acid and MgO constant, decreased the setting time. Decreasing the amount of MgO, keeping the amount of water and acid constant, increased the setting time.

TABLE 4

| Brick No. | Straw | Water | MgO | Acid |
|---|---|---|---|---|
| 1 | 1 | 1.5 | 2 | 2 |
| 2 | 1 | 1.5 | 2.5 | 2½ |
| 3 | 1 | 1.5 | 3 | 3 |
| 4 | 1 | 1.5 | 5 | 5 |

EXAMPLE 4

Bricks were made including the ingredients listed in Table 4 by weight. The bricks withstood exposure to flames exceeding 3000° F.

What is claimed is:

1. A bonded composite structure consisting essentially of: a binder made from a mixture of mono aluminum phosphate and a powdered base metal oxide at a ratio of 3:1 to 1:3 by weight of powdered base metal oxide to weak acid, said acid and metal fusing as a mixture under an exothermic reaction into said binder without releasing any noxious gases, and intact fibrous cellulose material particles mixed throughout said binder at a ratio of 1:1 to 1:6 of said fibrous material to said weak acid and encapsulated within said binder and rendered non-flammable thereby in a single essentially homogeneous layer, said structure having a melting temperature greater than 3000° F.

2. A structure as set forth in claim 1 wherein said fibrous cellulose material is selected from the group of cellulose waste materials consisting of sawdust, wood chips, shredded newspaper, straw, and bagasse.

3. A bonded composite structure consisting essentially of: a binder made from a mixture of a weak acid selected from the group consisting of ammonium polyphosphate and mono aluminum phosphate and a powdered base metal oxide, said acid and metal fusing as a mixture under an exothermic reaction into said binder, and fibrous cellulose material particles encapsulated within said binder and rendered non-flammable thereby, said fibrous cellulose material having a low density in the range from 3 to 15 pounds per cubic foot.

4. A structure as set forth in claim 1 wherein said powdered base metal oxide being magnesium oxide and said weak acid and base metal oxide being combined in a 3:1 to 1:3 ratio by weight.

5. A structure as set forth in claim 4 wherein said fibrous cellulose material is combined with said weak acid in a 1:1 to 1:6 ratio by weight.

6. A structure as set forth in claim 1 wherein said binder has a predetermined setting time, said binder mixture including water for delaying said setting time of said binder, said amount of water by part being directly related to said setting time.

7. A structure as set forth in claim 1 wherein said base metal oxide includes powder particles of a predetermined extent of being finely divided, said extent of being finely divided of said powder particles being directly related to said setting time.

8. A structure as set forth in claim 1 including a plasticizer for increasing the plasticity of said mixture.

9. A method of making a bonded composite structure consisting essentially of the steps of: mixing mono aluminum phosphate and a powdered base metal oxide which fuse as a mixture under an exothermic reaction into a binder; mixing fibrous intact cellulose particles into the binder to suspend the fibrous cellulose particles throughout the binder while encapsulating the fibrous cellulose particles within the binder and rendering the fibrous cellulose particles non-flammable thereby; forming the mixture into a substantially homogenous layer of intact fibrous particles encapsulated in the binder; and setting the formed mixture.

10. A method as set forth in claim 9 wherein said forming step is further defined as extruding the mixture.

11. A method as set forth in claim 9 wherein said forming step is further defined as spraying said mixture onto a previously formed structure to form fire protective and/or an insulation layer on the structure.

12. A method as set forth in claim 11 wherein said setting step is further defined as instantaneously setting said mixture in one to two seconds.

13. A method as set forth in claim 9 wherein said forming step is further defined as forming the mixture on an endless belt to form board and/or panel stock.

14. A method as set forth in claim 9 wherein said fibrous cellulose material is selected from the group of cellulose waste materials consisting of sawdust, wood chips, shredded newspaper, straw, and bagasse.

15. A method as set forth in claim 14 wherein said fibrous cellulose material has a low density in the range from 3 to 15 pounds per cubic foot.

16. A method as set forth in claim 9 wherein said fibrous cellulose material is combined with said weak acid in a 1:1 to 1:6 ratio by weight.

17. A method as set forth in claim 9 wherein said binder having a predetermined setting time, said binder mixture including water for delaying said setting time of said binder, said amount of water by part being inversely related to said setting time.

18. A method as set forth in claim 9 wherein said base metal oxide including powder particles of a predetermined extent of being finely divided, said method further including the step of varying the size of the powder particles, said extent of being finely divided of said powder particles being directly related to said setting time.

* * * * *